O. A. KENYON.
ELECTRIC WELDING.
APPLICATION FILED JUNE 28, 1916.
1,218,267.
Patented Mar. 6, 1917.
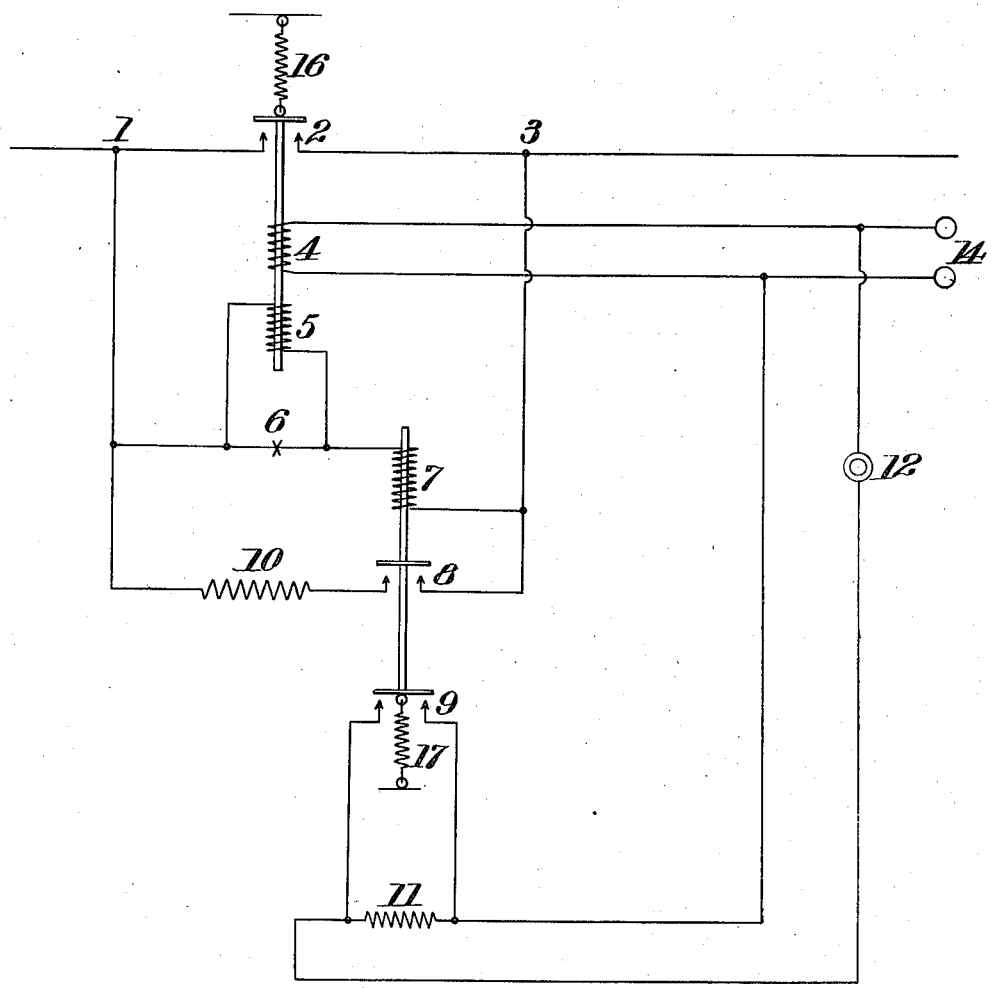
Inventor
Otis Allen Kenyon.
By T. Walter Fowler
Attorney

UNITED STATES PATENT OFFICE.

OTIS ALLEN KENYON, OF NEW YORK, N. Y.

ELECTRIC WELDING.

1,218,267.   Specification of Letters Patent.   Patented Mar. 6, 1917.

Application filed June 28, 1916. Serial No. 106,424.

*To all whom it may concern:*

Be it known that I, OTIS ALLEN KENYON, a citizen of the United States, residing at New York city, in the county of New York and State of New York, have invented certain new and useful Improvements in Electric Welding, of which the following is a specification.

My invention relates to the art of electric welding, and it consists of the parts and the arrangements and combinations of parts substantially as I will hereinafter describe and claim.

A leading object of the present invention is to combine with a welding arc circuit and a means for passing current therethrough, means which are under the control of the welder while welding for short-circuiting the arc and thereby stopping the operation thereof and to this end, I have shown in the accompanying drawing, which forms a part of this specification, a circuit diagram of an arc heat controller arranged for operation with novel shunt-means under the control of the welder, but it will be understood that my invention is intended to include other and different arrangements and in fact any arrangement of parts capable of producing my results and coming within the scope of the hereinafter recited claims.

In order that the present invention may be fully understood, and the value of the same appreciated, I will state that although electric arc welding is one of the oldest practical applications of electricity, it has apparently not come into the general use it might have, had it been better understood, and the welding current better controlled.

Heretofore, two general systems of electric distribution have been employed in electric arc welding; namely, the constant-potential system and the constant-current system. The first named system, namely, the constant-potential system, is the oldest and is universally used where more than one welder operates from the same machine. The constant-current system may properly be sub-divided into two types; namely, the open circuit and the closed circuit. The open-circuit system which is well known in the art is limited to use with one arc on each machine; it has other draw-backs, which I will hereinafter mention. The closed circuit constant-current system was, apparently, first disclosed in my prior Patent No. 1,181,227, dated May 2, 1916, which system has opened great possibilities in the way of heat control which exist in no other system of which I have knowledge.

That the advantages to be derived from the proper control of the heat effects in the welding arc may be better understood, it is desirable at this time to consider the factors which enter into said control. It is known that the rate of total heat production in the arc is equal to the power in watts consumed between the terminals of the arc, but the temperature of the metal is not simply nor directly related to the watts consumed. In order to control the temperature of the metal, it is necessary then to take into account all of the factors that determine it. Therefore, it may be well to analyze briefly, the production of heat in an electric welding arc.

Beginning with the pencil point which ordinarily, but not necessarily, is connected to the negative side of the circuit, we find that the temperature produced here depends upon the power in watts consumed at this point; that is, upon the product of the current through the arc and the E. M. F. drop at the terminal of the arc. Experience has shown that the E. M. F. drop at each terminal of the arc is practically constant, and independent of the current; that is, the resistance at each terminal of the arm decreases when the current increases, and vice versa, which accounts for the instability of a metallic arc when connected to a source of constant-potential, and this is the reason why it must be connected in series with a relatively large resistance. Therefore, since the E. M. F. is constant, the temperature of the metal at the pencil point, in other words, the flow of the metal from the pencil point depends almost entirely upon the current alone.

Again, the temperature of the metal in the arc stream is determined by the power consumed in the stream, and by the rate of flow from the pencil.

The resistance of the arc stream seems to be approximately constant per unit of length, so that the E. M. F. consumed is directly proportional to the length of the arc. This is the reason that a carbon arc with a long stream can be operated from a constant-potential source without a series resistance. The resistance of the arc stream takes the place of an external resistance and stabilizes the arc sufficiently to prevent its being extinguished. The power consumed in the arc is the product of the current through the arc and the voltage drop in the stream; while the flow of metal is determined by the current, as above indicated. Since the resistance of the stream is directly proportional to its length, the length of the arc is fixed by the voltage impressed across it. Therefore, in order to control the temperature of the metal in the stream, we must control both the current and the E. M. F. and each independently of the other.

The temperature at the end of the arc where it impinges upon the work depends upon the rate of flow of the metal, the temperature of the metal that arrives, and upon the rate at which energy is produced in the terminal itself, as well as upon the heat dissipating capacity of the mass surrounding the point where the metal is deposited. I have heretofore considered the origin of the heat brought in by the molten metal itself, and I will here state that the heat produced at this terminal of the arc is exactly similar to that produced at the other terminal; that is, it depends upon the current through the arc. Therefore, it will be seen that the final temperature of the metal depends upon both the current and the E. M. F., and that the value of each must be controlled independently, if anything like accurate results are to be obtained while still retaining the flexibility of application.

With this general reference to the prior art, and the requirements thereof, I will now state that in the present invention, I propose, in addition to the adjustment and automatic control of the heating effect by means of voltage limitation, and power regulation, to put means under the control of the welder for cutting down to any desired value the heat generated at the moment the arc is extinguished. The method by which I propose to accomplish this desired manual control in addition to automatic control, will be fully understood by reference to the figure, which illustrates one type of apparatus capable of carrying out my invention and which shows a circuit diagram of an arc heat controller arranged for operation with a shunt including a push button around the holding coil of a shunt relay.

In the aforesaid drawing 1 and 3 represent the terminals of a circuit; 2 is a short circuiting contact; 4 is a solenoid coil connected to a separate source of electric energy; 5 is a solenoid coil in a shunt circuit which includes the arc, the cores of the coils 4 and 5 being connected to the short circuit contact, 2, and to an appropriate spring, 16; 7 is a solenoid coil; and 8 is a contactor to be opened thereby, the core of said coil, 7, being connected to a contactor, 9, and to an appropriate closing spring, 17. In the main circuit is also a resistance, 10, and in a shunt circuit controlled by a push button, 12, is a resistance 11.

In the operation of my invention, the terminals, 1 and 3, are connected in a circuit which carries a constant current or a regulated current, and by which latter current, I mean a current that is automatically regulated in such a way, that a short circuit will not cause destructive rise in current. Normally, the terminals of this circuit are closed through the short circuiting contact, 2, which is held closed by the solenoid coil, 4, connected to a separate source, 14, of electric energy.

Connected to the terminals, 1 and 3, is the resistance 10, which is in series with the contact, 8, and the arc circuit, 6, and solenoid, 7, are in parallel therewith. The contactor, 8 is also normally closed, but no current passes that way, on account of the fact that the closure at the short circuiting contact, 2, reduces the voltage drop between the terminals, 1 and 3, to practically nothing. In operation, the pressing of the button, 12, or an equivalent switch member in the shunt circuit shown will short circuit the coil, 4, and release the contact, 2, under the pull of its spring, 16, and when this is done, the current in the main circuit must pass from the terminal, 1, through the resistor, 10, the contractor, 8, and the back to the terminal, 3, and the current through the resistor produces a drop in E. M. F. between the terminals 1 and 3, of the main circuit. Now, if the terminals of the arc, 6, are brought together, the resistance through that circuit will be so much less than through the resistor 10, and the contactor, 8, that a large proportion of the current will immediately pass through the arc and the solenoid coil, 7, and in doing so, this coil is energized and opens the contactor, 8, leaving the arc, 6, as the only path through which the main circuit is maintained and therefore carrying all of the current.

While welding, the button, 12, or its equivalent, is held closed which allows a definite proportion of the current from the source, 14, to pass around the solenoid coil, 4, and through the shunt, 11, which was brought in circuit by the opening of the contactor, 9, to which the core of the coil, 7, is attached and which is suitably connected to the contactor, 8.

As the arc is lengthened and shortened, in operation, more or less current is shunted through the solenoid coil, 5, which is so arranged with the coil, 4, that these coils assist each other in pulling against the spring, 16, and whenever the E. M. F. across the arc rises sufficiently, it will force enough current through the solenoid coil, 5, so that the combined pull on the coils, 4 and 5, will overcome the tension of the spring, 16, and short circuit the arc, by closing the contactor, 2, an operation which prevents absolutely any further rise in E. M. F. and kills the arc without any possibility of temperature increase which will burn the metal.

When the operator desires to withdraw from the circuit with a reduced heat instead of an increased heat, as is usual, he simply releases the push button, 12, thereby opening the shunt, 11, and forcing all of the current from the source, 14, through the coil, 4, this coil and the coil, 5, being so designed that coil, 4, is expected under normal conditions, to operate with a shunt across it, the sudden opening of the shunt circuit, 12, forcing all of the current from the source, 14, through the coil, 4, closes the contactor, 2, immediately without any increase in current through the coil, 5, said coil, 4, holding the contactor closed and thus killing the arc, 6, and coil, 7. The contactors, 8 and 9, being again closed by the action of the spring, 17, the control circuit is left in exactly the same condition as when starting the operation; that is, the parts are in condition to begin welding.

According to present day and previous arc welding practice, the usual operation of starting the arc is to prepare the parts to be welded, place them in position, then place a screen before the eyes and strike an arc as near the proper point as the welder can instinctively determine.

In welding large parts it is of little importance whether the welder strikes the parts in any exact position, but when welding a light metal part to a heavier part, or welding through a hole, it is very important that the pencil be placed accurately in position, because the arc in the wrong place will burn a hole in the metal. Heretofore, this has always been done by instinctive action on the part of the welder; as the screen held before his eyes prevents him from seeing anything until the arc is struck.

Furthermore, according to the present day practice, the welding pencil is always connected to the circuit while the welder is working, and whenever he lays the pencil down to leave it, he must take care not to have it come into contact with the work, or any object that is connected with the other side of the circuit, because in such event, an arc will be formed which may injure his eyes and which is pretty apt to damage the electrode holder, or even damage the work. In boilers, this is particularly important, as an accidental arc may burn a hole in the plate or otherwise damage the boiler. My present invention has to do with means for overcoming these difficulties. To begin with, the welding electrode holder and welding pencil are normally dead, they are always connected to the circuit, but the gap is bridged by a short circuit so there is no tendency whatever for current to flow from the end of the welding pencil until the welder is ready and operates a releasing switch which is preferably located in the handle of the welding tool, not shown.

According to the present invention it is possible for the welder to place the pencil exactly where he wants to start the arc, then cover his eyes with a screen, release the switch or push button, 12, and draw the arc. The present invention also provides automatic means for "killing" the electrode holder and welding pencil whenever the arc is extinguished, so that it makes no difference when and how the arc may be extinguished, the electrode-holder and welding pencil will always be "dead" and can be dropped or let down anywhere without danger.

If the welder should release the short circuit and thus energize his welding tool and then change his mind about welding, and lay it down, the arc will be formed, but instantly will extinguish itself by automatically restoring the short circuit.

From the foregoing description it will be apparent that I propose in addition to the adjustment and automatic control of the heating effect by means of voltage limitation and power regulation, to employ means which are under the control of the welder for cutting down to any desired value the heat generated at the moment the arc is extinguished, an operation which I regard as of the utmost value in the art of electric welding.

Having thus described my invention what I claim as new and desire to secure by Letters Patent is:—

1. In electric welding, a source of electricity, a welding circuit, and means under the control of the welder for passing current from said source through the arc circuit after the welding pencil is in contact or stopping the passage thereof, while the welding operation is in progress.

2. In electric welding, a source of electricity, a welding arc circuit, and means for passing current from said source through said circuit, in combination with electro-responsive means under the control of the welder for permitting or stopping the passage of current through the arc circuit.

3. In electric welding, a main circuit, and an arc circuit connected therein and constructed to maintain the conductance of the main circuit, in combination with controllable electro-responsive means for shunting current from the main circuit into and out of the arc circuit.

4. In an arc welding system, a welding arc circuit to be closed by a welding pencil before current is passed into said circuit, and means for short circuiting the arc at any time under control of the welder while welding.

5. In an arc welding system, a welding arc circuit to be closed by a welding pencil before current is passed into said circuit, and means for short circuiting the arc at any time under control of the welder while welding, in combination with means for automatically short circuiting the arc at a predetermined voltage.

In testimony whereof I affix my signature.

OTIS ALLEN KENYON.